(12) United States Patent
Larsen et al.

(10) Patent No.: US 9,249,784 B2
(45) Date of Patent: Feb. 2, 2016

(54) TRANSITION STRUCTURE FOR A WIND TURBINE TOWER

(75) Inventors: Gerner Larsen, Hinnerup (DK); Niels Christian Olsen, Tjele (DK)

(73) Assignee: Vestas Wind Systems A/S, Aarhus N. (DK)

( * ) Notice: Subject to any disclaimer, the term of this patent is extended or adjusted under 35 U.S.C. 154(b) by 8 days.

(21) Appl. No.: 14/342,249

(22) PCT Filed: Aug. 29, 2012

(86) PCT No.: PCT/DK2012/050319
§ 371 (c)(1),
(2), (4) Date: Jun. 19, 2014

(87) PCT Pub. No.: WO2013/029626
PCT Pub. Date: Mar. 7, 2013

(65) Prior Publication Data
US 2014/0345218 A1    Nov. 27, 2014

Related U.S. Application Data

(60) Provisional application No. 61/528,928, filed on Aug. 30, 2011.

(30) Foreign Application Priority Data

Aug. 31, 2011    (DK) ................. 2011 70486

(51) Int. Cl.
*B66C 23/34*    (2006.01)
*E04H 12/34*    (2006.01)
(Continued)

(52) U.S. Cl.
CPC .......... *F03D 11/045* (2013.01); *E02B 17/0004* (2013.01); *E02B 17/027* (2013.01);
(Continued)

(58) Field of Classification Search
CPC ..... E04H 12/34; E04H 12/347; E04H 12/187; E04C 3/32; E04B 1/34363; E02D 27/425; E02D 27/42; F03D 11/04; F03D 11/045; F05B 2240/9121

USPC .......... 52/123.1, 152, 292, 297, 298, 745.17, 52/745.19, 299; 405/204, 206
See application file for complete search history.

(56) References Cited

U.S. PATENT DOCUMENTS 3,363,795 A * 1/1968 Stuart, III ............... E03B 11/12
                                                                220/567
8,316,615 B2 * 11/2012 Haridasu et al. ........... 52/745.17
(Continued)

FOREIGN PATENT DOCUMENTS

DE    102010026117 A1    3/2011
EP        2149703 A2    2/2010
(Continued)

OTHER PUBLICATIONS

Danish Patent Office, combined search and examination report issued in corresponding DK Application No. PA 2011 70486 dated Apr. 12, 2012, 4 pages.
(Continued)

*Primary Examiner* — Chi Q Nguyen
(74) *Attorney, Agent, or Firm* — Wood, Herron & Evans, LLP

(57) ABSTRACT

A transition structure for a tower comprises a plurality of panels that each includes a panel body having opposed upper and lower ends, a lower mounting surface at the lower end, an upper mounting surface at the upper end, and a pair of lateral mounting surfaces at lateral edges. The upper mounting surfaces are generally planar, and the panel bodies taper from their upper mounting surface to their lower mounting surface. Each panel is mounted to at least another of the panels at corresponding lateral surfaces to form, with the upper ends, the shape that conforms to the lower end of the tower to be supported. The transition structure also comprises a plurality of footings, each having an upper end mated to the lower mounting surface of one of the panels, a lower end configured to mate with a post of a foundation, and a footing body between the upper and lower ends.

16 Claims, 11 Drawing Sheets

(51) Int. Cl.
  F03D 11/04 (2006.01)
  E02D 27/42 (2006.01)
  E04H 12/00 (2006.01)
  E02B 17/00 (2006.01)
  E02B 17/02 (2006.01)
  E04H 12/18 (2006.01)
  E04B 1/343 (2006.01)

(52) U.S. Cl.
  CPC .............. E02D27/425 (2013.01); E04H 12/00 (2013.01); F03D 11/04 (2013.01); *E02B 2017/0091* (2013.01); *E04B 1/34363* (2013.01); *E04H 12/187* (2013.01); *E04H 12/34* (2013.01); *E04H 12/347* (2013.01); *F05B 2240/912* (2013.01); *F05B 2240/95* (2013.01); *Y02E 10/727* (2013.01); *Y02E 10/728* (2013.01); *Y10T 29/49631* (2015.01)

(56) References Cited

U.S. PATENT DOCUMENTS

| | | | |
|---|---|---|---|
| 8,516,774 B2* | 8/2013 | Zavitz | E04H 12/12 52/223.4 |
| 8,833,004 B2* | 9/2014 | Prass | E02D 27/425 52/169.1 |
| 2006/0267348 A1 | 11/2006 | Weitkamp et al. | |
| 2007/0294955 A1* | 12/2007 | Sportel | 52/40 |
| 2008/0256892 A1* | 10/2008 | Franke | 52/655.1 |
| 2010/0132269 A1 | 6/2010 | Bagepalli et al. | |
| 2010/0132270 A1* | 6/2010 | Willey et al. | 52/79.5 |
| 2011/0061321 A1* | 3/2011 | Phuly | 52/297 |
| 2011/0138721 A1 | 6/2011 | Bagepalli et al. | |
| 2013/0212963 A1* | 8/2013 | Miks et al. | 52/223.4 |
| 2014/0147272 A1* | 5/2014 | Donescu | F03D 11/0058 416/1 |
| 2014/0345218 A1* | 11/2014 | Larsen et al. | 52/299 |

FOREIGN PATENT DOCUMENTS

| | | |
|---|---|---|
| EP | 2290237 A2 | 3/2011 |
| WO | 2006078167 A2 | 7/2006 |

OTHER PUBLICATIONS

International Searching Authority, Search Report and Written Opinion issued in corresponding International Application No. PCT/DK2012/050319 dated Nov. 13, 2012, 8 pages.

* cited by examiner

TRANSITION STRUCTURE FOR A WIND TURBINE TOWER

TECHNICAL FIELD

Aspects of the invention relate to structures for supporting towers, and more particularly to transition structures that support towers of wind turbines on top of foundations that include multiple post-like structures, such as jacket-type foundations, as may be found in offshore wind turbine installations

BACKGROUND

Wind turbines typically include a rotor having multiple blades mounted to a hub. The rotor is supported from within a nacelle of the wind turbine that also houses drivetrain components, such as a rotor shaft, gearbox, generator, and potentially a converter and a transformer. A tower provides support for and elevates the nacelle above the ground or sea. The tower is supported from below by a foundation.

The design of the foundation is highly influenced by the site of the wind turbine and its geotechnical considerations. In offshore applications, monopile foundations, gravity-based foundations, tripod foundations, and jacket-type foundations are well-known. The latter type typically includes three or four steel posts ("legs") secured to the seabed with piles. A transition structure is mounted to the posts to provide a base for supporting the tower. Examples of this type of arrangement are disclosed in EP1813808B1 and WO2008064861A2.

SUMMARY

Aspects of the invention described herein relate to a transition structure for supporting a tower from below. The transition structure provides a smooth force flow between a lower end of a tower and a foundation having multiple posts or similar structures that support the tower. The smooth transition is desirable to avoid stress concentrations within the transition structure and/or to minimize the amount of material that is used to form the transition structure. According to various embodiments, the transition structure comprises a plurality of panels that each include a panel body having opposed upper and lower ends, a lower mounting surface at the lower end, an upper mounting surface at the upper end, and a pair of lateral mounting surfaces at lateral edges. The upper mounting surfaces are generally planar, and the panel bodies taper from their upper mounting surface to their lower mounting surface. Each panel is mounted to at least another of the panels at corresponding lateral surfaces to form, with the upper ends, a shape that conforms to the lower end of the tower to be supported. The transition structure also comprises a plurality of footing that each include an upper end mated to the lower mounting surface of one of the panels, a lower end configured to mate with one of the posts of the foundation, and a footing body between the upper and lower ends.

In another aspect, transition structure has a conical shape with a batter angle that is substantially matches that of a foundation to which the transition structure is mounted. More specifically, the posts of the foundation have a batter angle. The panels and footings of the transition structure are arranged to provide the transition structure with a batter angle generally corresponding to the batter angle of the posts. Each of the formed panels may additionally be shaped like as a conical section, tapering from an upper edge to a lower edge, near where the panel mounts to the associated footing that provides smooth transition to the foundation. As may be appreciated, conical shapes may provide improved strength to the structure, particularly against buckling.

According to another aspect, each post of the foundation extends along a longitudinal axis through the center of the post. The lower end each footing defines a mounting that is generally planar and that lies orthogonal to the longitudinal axis of the associated post.

According to yet another aspect, a method of manufacturing a transition structure is disclosed that includes cutting a plurality of sub-panels from flat sheet material. The plurality of sub-panels are joined together to form a primary surface that extends from an upper end having a first radius of curvature to a lower end having a second radius of curvature, less than the first radius of curvature. One or more flanges are cut from flat sheet material and are joined to edges of the primary surface to manufacture a formed panel of the transition structure.

The transition structure may be constructed in a manner that optimizes material and allows for easier shipment. Formed panels of the transition structure may be constructed in a factory from sheet material in a manner that optimizes material use. According to some approaches, the panels may be formed from sheet steel using primarily cutting, bending, and welding processes, while avoiding more complex processes. The formed panels may be made to a size that promotes relatively easy shipment, whether on land or over sea. More complex geometries may be included the footings, which may be formed with greater ease through casting or similar processes.

To this end, a method of making a transition structure is also disclosed. The method comprises forming a plurality panels by bending or rolling sheets of steel into a panel body having an upper end and lower end. Lateral mounting surfaces of each panel are then joined to corresponding lateral mounting surfaces of other panels. After the panels have been joined, the upper ends of the panel bodies form a shape that corresponds to a lower end of the tower to be supported. The method also involves casting a plurality of footings, which each include an upper end, lower end, and footing body between the upper and lower ends. Eventually the upper end of each footing is bolted or welded to the lower mounting surface of one of the panels, thereby forming the transition structure.

According to one aspect, forming the plurality of panels involves welding one or more flanges to the panel bodies. For example, the method may involve welding respective upper flanges to the upper end of each panel body so that the upper flanges define the upper mounting surfaces. The method may alternatively or additionally involve welding respective lower flanges to the lower end of each panel body so that the lower flanges define the lower mounting surfaces. The lower flanges are bolted to flanges on the upper ends of the footings in such embodiments. Finally, the method may alternatively or additionally involve welding respective lateral flanges to the lateral edges of each panel body so that the lateral flanges define the lateral mounting surfaces.

The steps of the methods disclosed herein may be performed in any order unless otherwise noted. For example, according to one aspect, the upper end of each footing is bolted or welded to the lower mounting surface of one of the panels after joining the lateral mounting surfaces of the panels. According to another aspect, however, these steps could be performed in a reverse order.

These and other aspects of the invention will be appreciated from the following description and claims.

BRIEF DESCRIPTION OF THE DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings.

DETAILED DESCRIPTION

Figure 1:
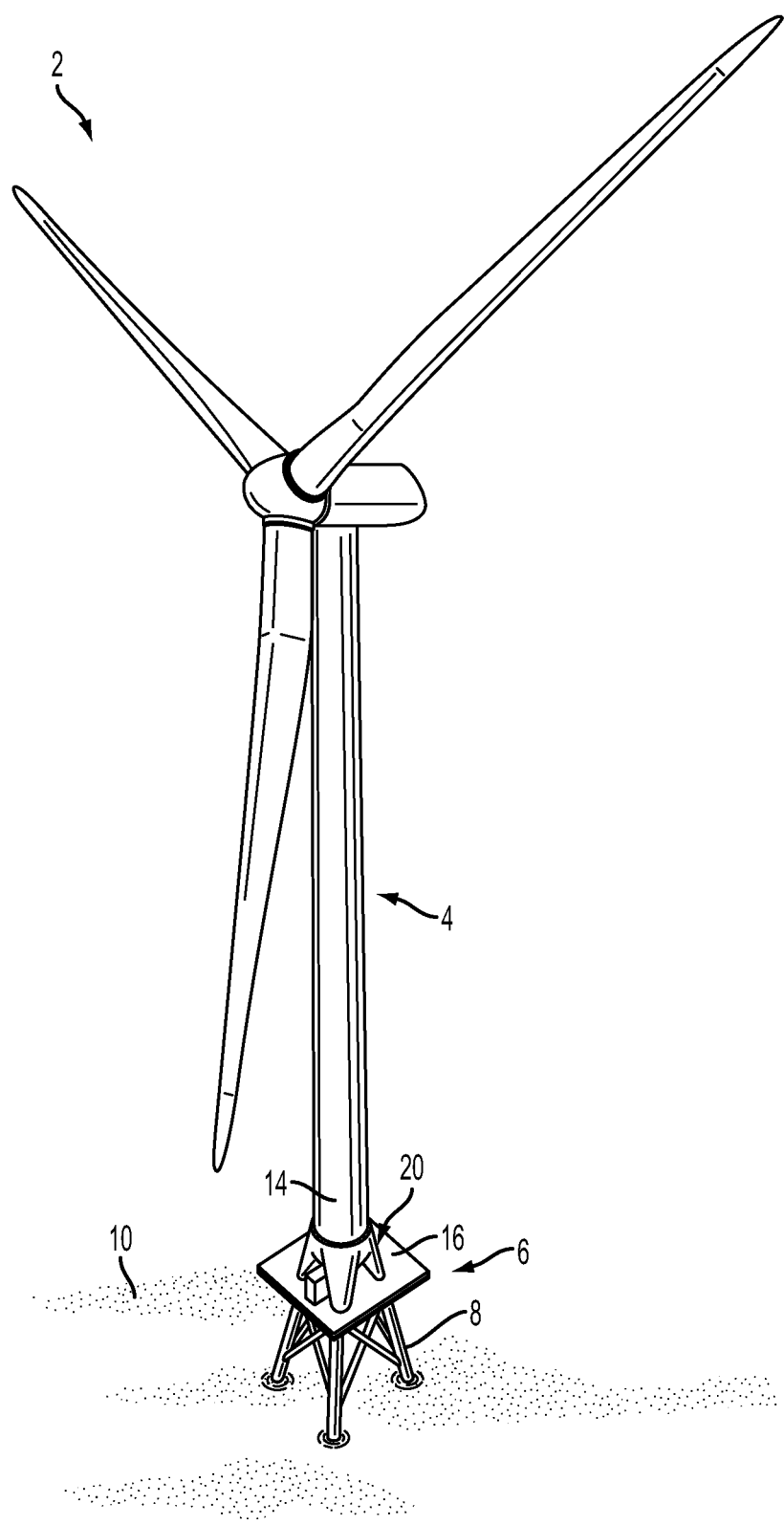
FIG. 1 is a perspective view of an offshore wind turbine having a tower mounted to a jacket-type foundation with a transition structure.

FIG. 1 shows one example of a wind turbine 2 in an offshore application. The wind turbine 2 includes a tower 4 supported by a jacket-type foundation 6. The jacket-type foundation 6 includes multiple legs or posts 8 that are supported at the sea floor by pilings and that extend above the sea level 10 to support the wind turbine. A transition structure 20 provides a connection between upper ends 12 of the legs/posts 8 and a lower circular end 14 of the tower 4. A platform 16 may also be mounted on the foundation 6, as illustrated, to receive service vessels, personnel, and equipment.

Aspects of the invention described herein relate to the transition/support structure 20, which provides a smooth structural transition between the lower end 14 of the tower 4 and the multiple legs 8, as may be found in jacket-type offshore foundations like that shown in FIG. 1, or similar structures that support a tower from below. Thus, although FIG. 1 illustrates the transition structure 20 being used with a jacket-type offshore foundation, the invention is not limited to such applications.

Figure 2:
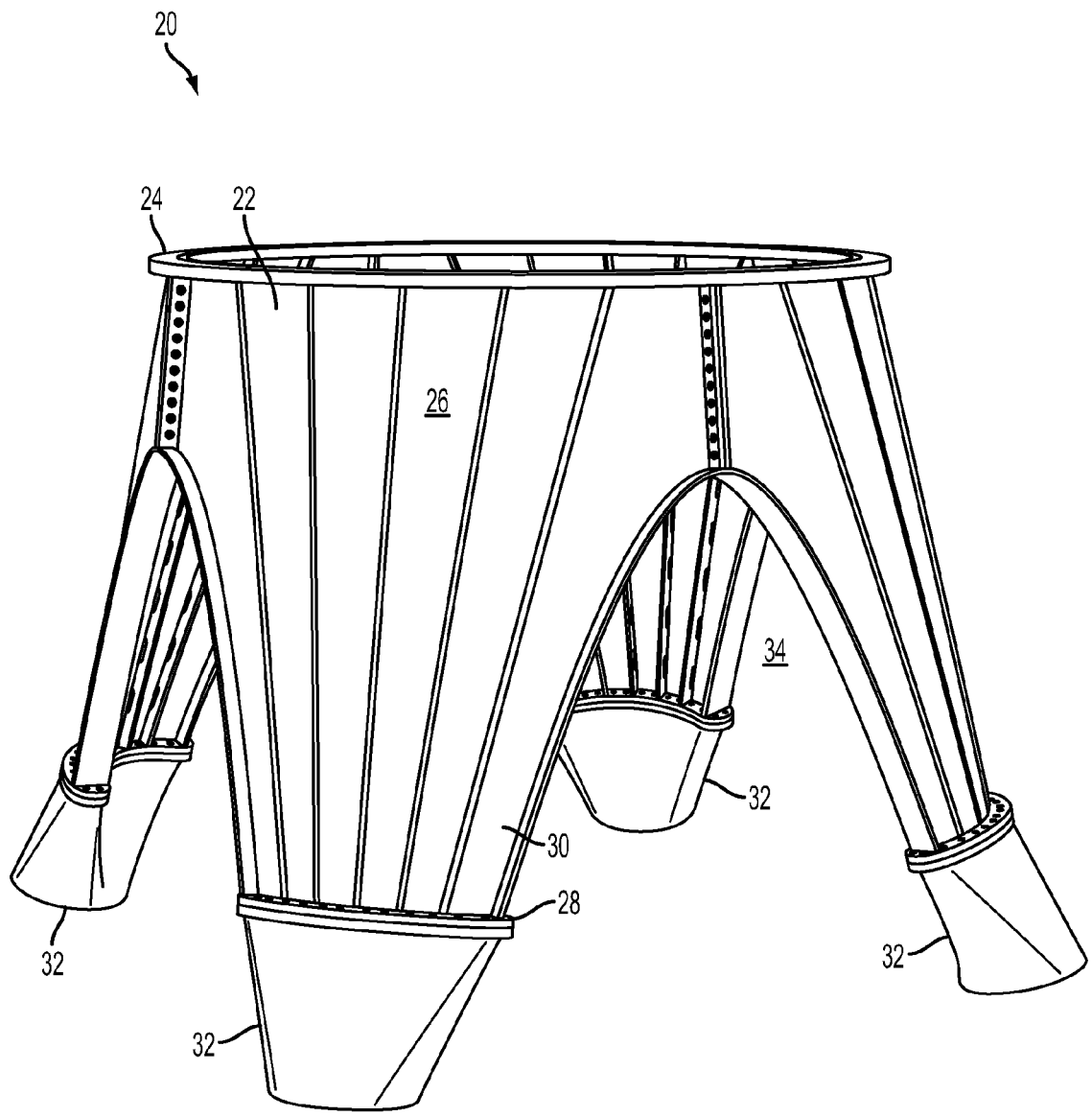
FIG. 2 is a perspective view of a transition structure that may be used to mount a tower to a foundation according to one embodiment.

In the embodiment shown in FIG. 2, the transition structure 20 has a generally smooth, conical shape that includes, at an upper end 22, a circular flange 24 that mates to the lower end of a tower to be supported. The transition structure 20 also includes multiple, formed panels 26 that each extend from the upper end 22 toward an arcuate flange 28 at a lower end 30 that mates with a corresponding footing 32. Each of the footings 32 provide a smooth structural transition between the arcuate flange 28 at the lower end 30 of the corresponding formed panel 26 and the legs 8 (FIG. 1) of the foundation 6. Constructing the transition structure 20 from multiple formed panels 26 and footings 32 may promote easier transportation, easier manufacturing, and/or more efficient use of material.

The transition structure 20 may provide a passageway into a space beneath the tower 4, which may be used to access the interior of the tower 4 from below, rather than through a doorway in a side of the tower 4. As illustrated, each of the formed panels 26 taper from the upper end 22 to the arcuate flanges 28 at the lower ends 30, thus leaving spaces 34 between adjacent formed panels 26. These spaces may be used to allow passage of personnel and/or equipment to or from the interior of the tower from a doorway located on the lower side of the tower. As may be appreciated, conventional tower structures often include thickened wall sections around doorways positioned in the side of the tower to compensate for the increased stresses associated with the doorway. Positioning a doorway at the underside of a tower, which is not a highly stressed area, unlike the side walls of the tower, may allow a tower to be constructed without thickened wall sections. Additionally, equipment may be hoisted to or from the space below the tower with greater ease than is typical with transporting equipment through a tower side wall. According to some on-shore embodiments, a dolly or truck may even access the space below the tower to allow equipment to be hoisted directly therefrom.

Figure 3:
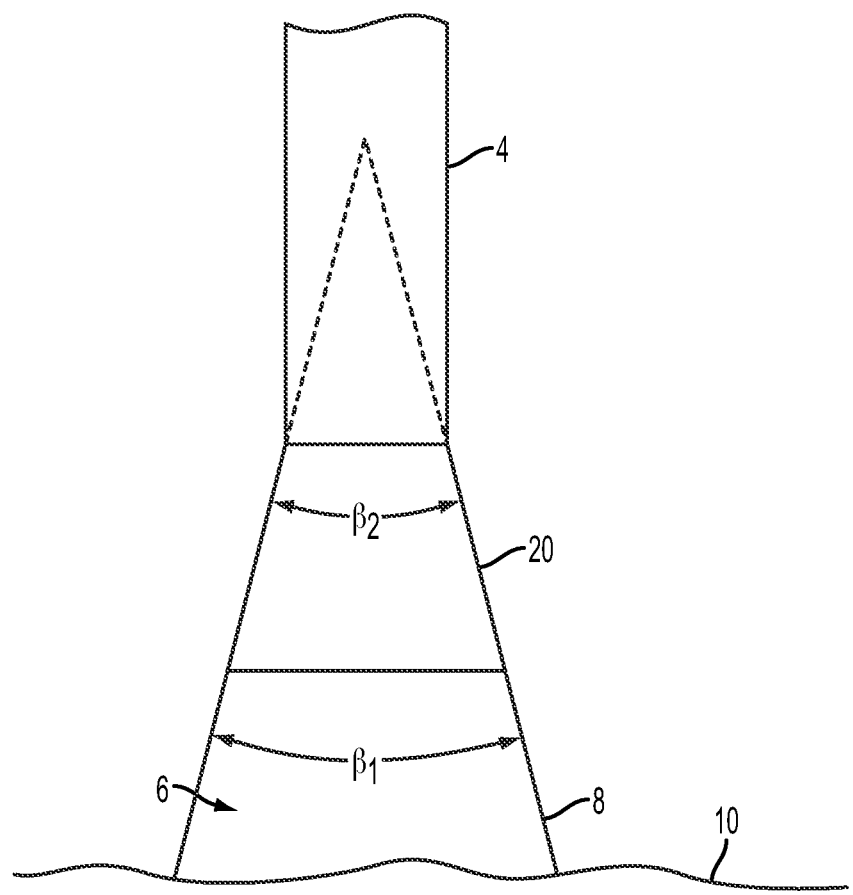
FIG. 3 is a schematic side view of an offshore, jacket-type foundation and a transition structure, illustrating the consistent batter angle of each, according to one embodiment.

FIG. 3 shows, schematically, the batter angle $\beta 1$ at which the legs 8 of jacket-type foundation 6 lie, and the batter angle $\beta 2$ generally formed by the overall shape of a transition structure 20, according to one embodiment. As shown, the batter angles of the foundation 6 and transition structure 20 are substantially the same, which may help promote smooth and efficient force transfer from the tower 4 to the foundation 6. As may be appreciated, the loads received by the foundation 6 are primarily in compression, and eliminating or minimizing bends or other deviations in the force path from the wind turbine to the legs 8 of the foundation 6 may strengthen the overall structure, particularly buckling in compression.

Figure 4:
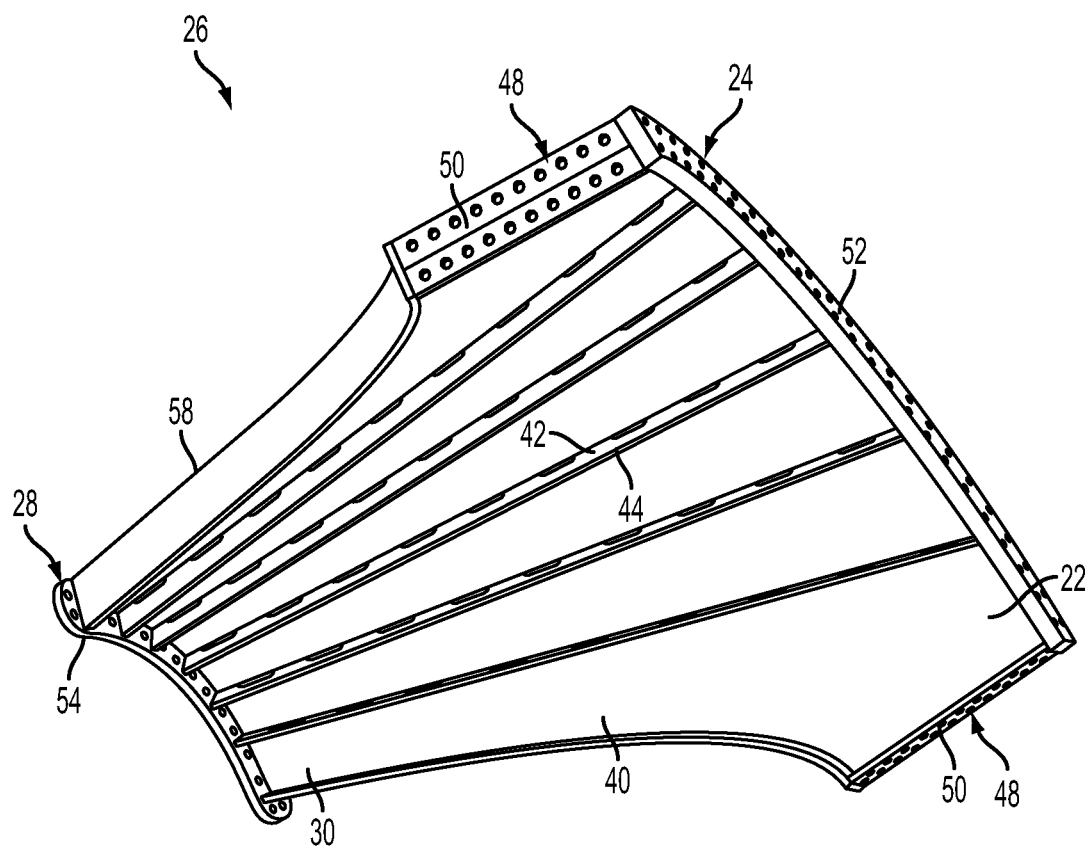
FIG. 4 is a perspective view of a panel used in the embodiment of FIG. 2.

FIG. 4 shows a formed panel 26 that may be used to construct the transition structure 20 shown in FIG. 2. As may be seen from the figures, the formed panel 26 includes a panel body 40 that is generally curved about an axis extending from the upper end 22 to the lower end 30 of the panel 26 (lying generally parallel to posts of a foundation to which the transition structure 20 mates). The formed panel 26 may have a smoothly curved surface or may include substantially flat panel segments separated by bends 42, as will be discussed in greater detail herein. Stiffening ribs 44 may also be provided to strengthen the panel 26, particularly to prevent buckling. Edges of the panel 26 may include flanges that provide additional strength to the formed panel 26 and/or provide a surface for mounting to the lower end of a tower, other formed panels, footings, or directly to a foundation. For example, in FIG. 2, lateral edges of the panel body 40 include lateral flanges 48 that define lateral mounting surfaces 50 configured to mount to the lateral mounting surface of another panel body. The upper end 22 of the panel body 40 includes the flange 24, which defines a generally planar (i.e., flat) upper mounting surface 52. Thus, the upper mounting surface 52 has an arcuate profile (i.e., an arcuate shape in the plane in which the upper mounting surface 52 extends) due to the shape of the flange 24. The lower end 30 of the panel body includes the flange 28, which defines a lower mounting surface 54 configured to mate to a footing 32. Edges between the lateral flanges 48 and flange 28 may be provided with flanges 58 to further increase structural rigidity and resistance to buckling.

The upper mounting surface 52 and the upper end 22 of the panel body 40 have a radius of curvature that generally matches that of the tower that is to be supported. Although the upper end 22 and tower 4 are shown as being circular in the figures, it is to be appreciated that polygonal, oval, or other cross-sectional shapes of towers to be supported are also possible and are contemplated. The lower end 30 of each panel body 40 is also illustrated as being generally curved, but at a smaller radius of curvature than the upper end 22. Each of the panel bodies 40 has a substantially conical shape that tapers from the larger radius of curvature of the upper end 22 to the smaller radius of curvature of the lower end 30. This conical shape, like the overall conical structure of the tower transition structure 20, may provide additional strength, particularly in compression. The lower end 30 of the panel bodies 40 shown in FIGS. 2 and 4 has a radius of curvature that is about ½ the radius of curvature of the upper end 22 of the panel body 40. It is to be appreciated that other configurations are also possible, including ratios of ¼, ¾, 1, 2, 3, or 4, as aspects of the invention are not limited in this respect.

The embodiment of FIGS. 2 and 4 is constructed for a foundation that has four legs (or equivalent structures). Each formed panel 26 has an upper end that extends over an arc of about 90 degrees and a lower end that defines a mounting for a single footing, which is turn is designed to mount to a single foundation leg. Foundations with different numbers of legs, such as 3 legs or 5 legs, or even on-shore foundations formed as slabs or other types of structures may include different numbers of formed panels 26 and footings 32. Where the number of formed panels 26 is different than 4, each of the formed panels most likely will have an upper end that extends over an arc length different than 90 degrees.

Figure 5:
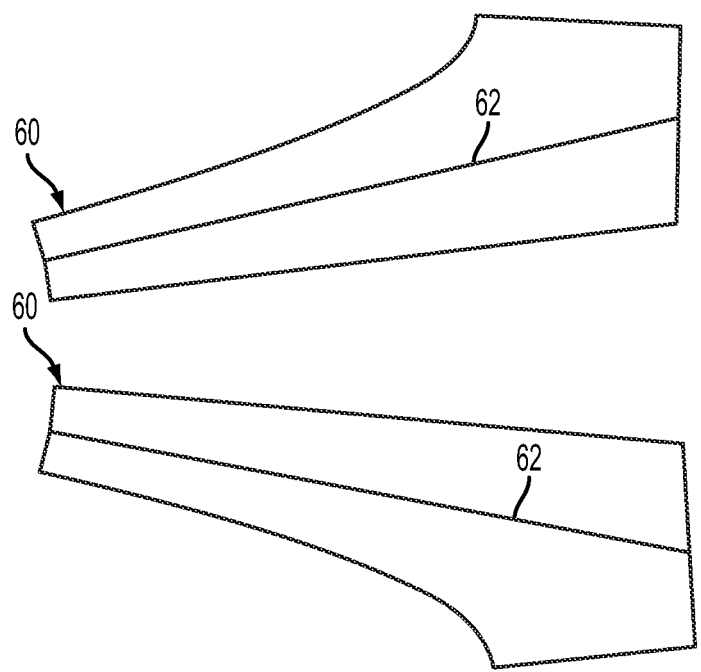
FIG. 5 schematically shows two of three sub-panels that may be formed of sheet metal in forming the basic structure of the panel shown in FIG. 4.

According to some embodiments, formed panels 26 as shown in FIG. 4, may be constructed from a number of smaller sub-panels. By way of example, FIG. 5 shows two of three sub-panels 60 that may be used to form basic structure of the panel 26 shown in FIG. 4. Each of the sub-panels 60 shown in FIG. 5 may be cut from a single sheet of steel, or other material, and bent along the illustrated bend line 62 in a forming process. The illustrated sub-panels 60 may be welded to a third, central sub-panel (not shown in FIG. 5) to form the basic panel structure. Flanges and stiffening ribs (not shown in FIG. 5, but discussed above in connection with the formed panel 26) may then be welded to the basic structure to complete the formed panel 26.

Embodiments of the formed panels 26 may include various features to provide strength in compression, particularly to prevent buckling. As discussed above, the overall generally curved and/or conical shape of the formed panels 26 provides some strengthening against buckling. Bends 42 that extend at least generally parallel to the direction of compression (i.e., parallel to the posts of a foundation) may help further prevent buckling. Flanges 24 and 28 positioned at the upper and lower ends, and flanges 48 and 58 along other edges of the formed panels 26 also provide strength against buckling, as do the stiffening ribs 44 that may be welded to a surface, typically an interior surface, of the formed panel 26. According to some embodiments, formed panels 26 may include a combination of stiffening ribs 44 and bends 42 alternately positioned on the panel 26 to both stiffen the structure and optimize the use of material. Other configurations are also possible and are contemplated though, including embodiments that have stiffening ribs 44 positioned directly on top of or immediately adjacent to bends 42 (as shown in FIG. 4), and embodiments that lack stiffening ribs and/or bends altogether.

Figure 6:
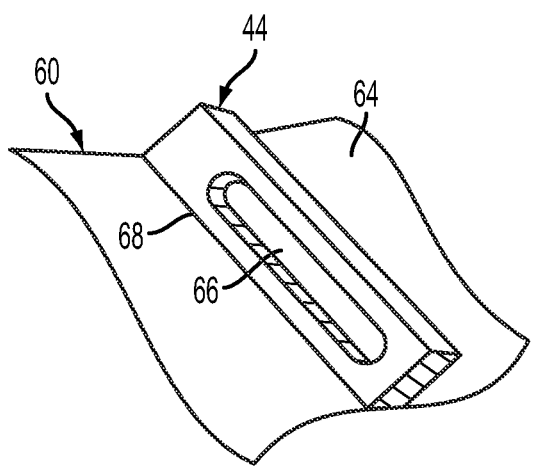
FIG. 6 shows a partial view of a stiffening rib welded to a sub-panel, according to one embodiment.

Stiffening ribs may be constructed in different ways. According to some embodiments, and as shown in FIG. 6, the ribs 44 may include strips or material, such as steel, welded or otherwise fastened to the surface 64 of a sub-panel 60. Material savings may be achieved, however, by removing some material to form apertures 66 in central portions of the ribs 44. This may be accomplished without removing material from an edge 68 of the rib 44 that contacts the sub-panel 60, so as to allow for a continuous weld that runs the length of the rib 44, preventing stress risers that might otherwise occur at terminations or start/stop positions along a weld. Other configuration are also possible, including those that lack stiffening ribs altogether, as aspects of the invention are not limited in this respect.

Connections between sub-panels 60 and flanges in the formed panels 26 may be configured to promote smooth force transitions. By way of example, as may be seen in FIGS. 2 and 4, the edges of a panel body 40 may be mounted to central portions of the flanges 24, 28, 48, and 58, rather than edge portions of the flanges. In this respect, the forces applied to or from the flange from a panel body 40 are applied substantially evenly across the surface of the flange rather than predominantly at one edge or side of the flange.

The flanges 24, 28 at the upper and lower ends 22, 30 of the formed panels 26 and the lateral flanges 48 that are used to mate with adjacent formed panels are shown in the figures as bolted joints. It is to be appreciated, however, that other types of joints may be used in place of any one or all of the flanges 24, 28, 48. By way of example, the embodiment shown in FIG. 7 lacks lateral flanges for joining to adjacent formed panels, and instead utilizes a weld at this joint.

Figure 7:
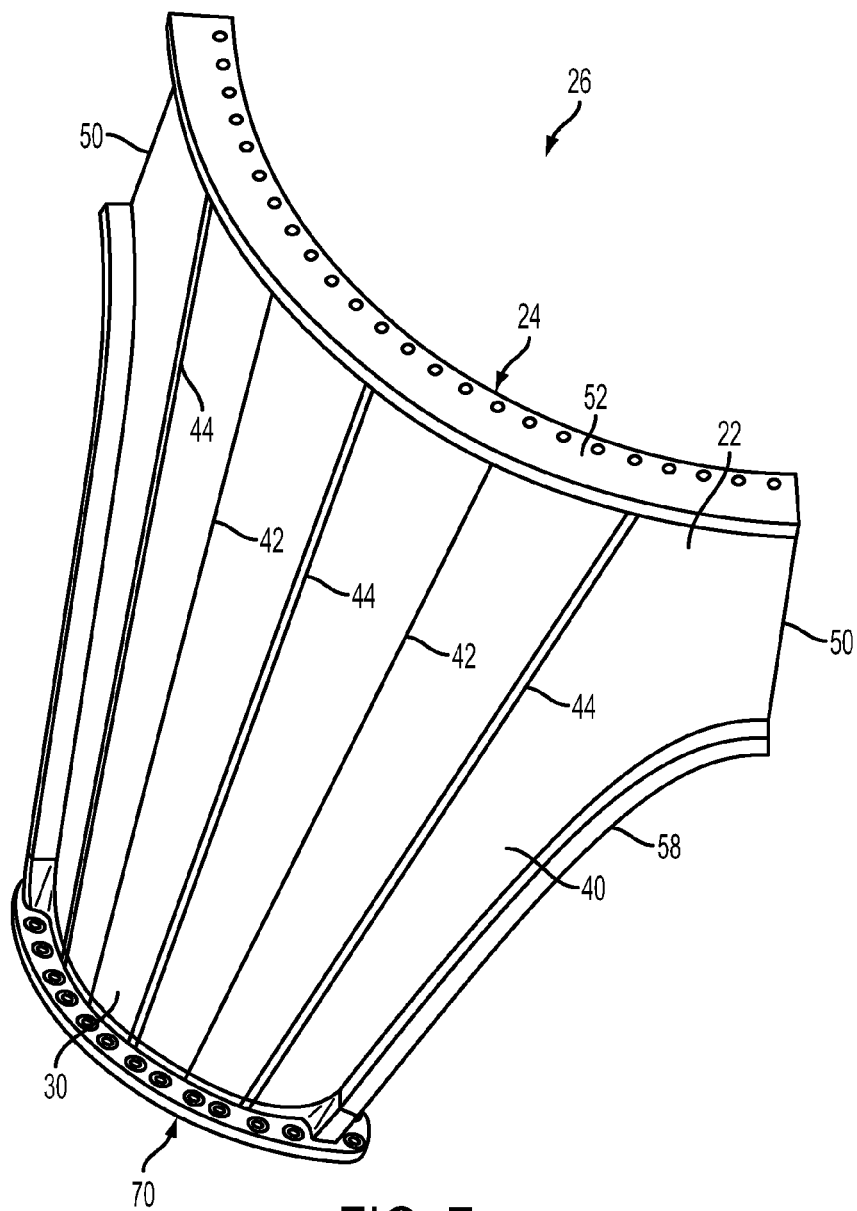
FIG. 7 shows a panel having an arcuate flange at a lower end that includes integrally formed extensions to mate with a body of the panel, according to one embodiment.
Figure 8:
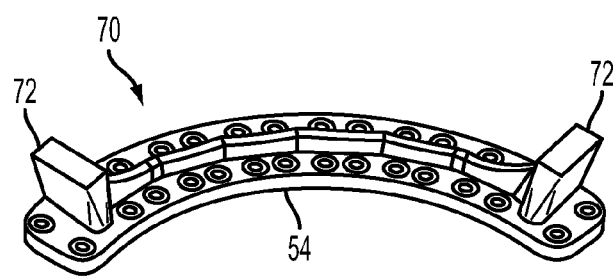
FIG. 8 shows the arcuate flange of the embodiment shown in FIG. 7.

Furthermore, FIGS. 7 and 8 show one alternative embodiment of a flange 70 that may be used at the lower end 30 of a formed panel 26. As shown, protruding portions 72 that are aligned with lateral edges of the panel body 40, and that extend into the plane of the formed panel itself, may be integrally formed into the arcuate flange 70. Including such protrusions/extensions 72 in the arcuate flange 70 may promote improved force flow and/or provide for an easier welding process to the panel body 40. Various techniques may be used to form arcuate flanges 70 like that shown in FIGS. 7 and 8, including casting processes, hot forming processes, upwelding processes, and hydroforming, to name a few.

Figure 9:
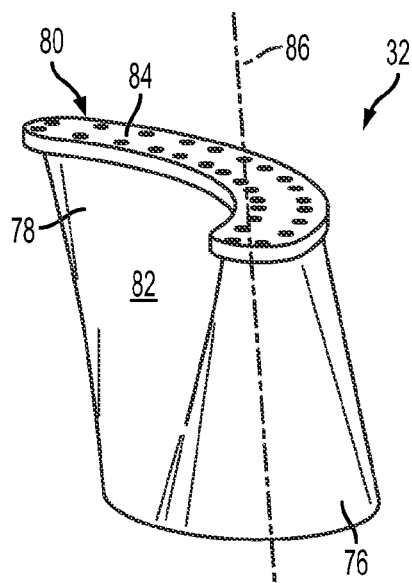
FIG. 9 is a perspective view of a footing, according to one embodiment.
Figure 10:
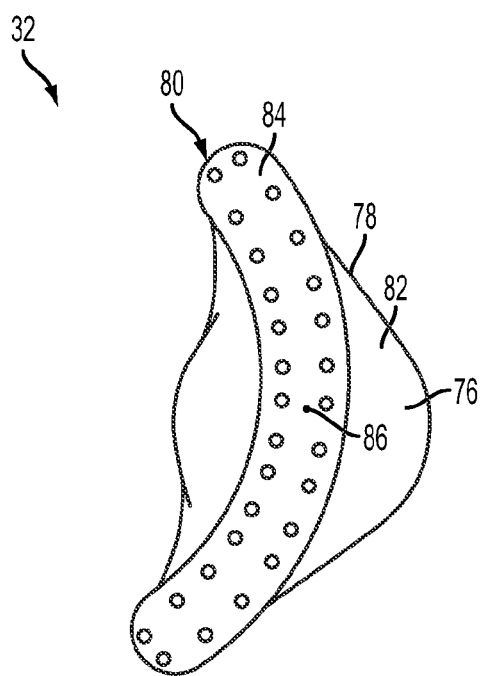
FIG. 10 shows the footing of FIG. 9, as viewed along an axis that lies orthogonal to a joint face of the footing.

One embodiment of the footing 32, as utilized in the embodiment of FIG. 2, is shown in greater detail in FIGS. 9 and 10. The footing 32 has a lower end 76 configured to mate to the upper end of a leg 8 (FIG. 1) of an offshore foundation, or other similar structure, whether used on-shore or offshore. The lower end 76 may define a substantially circular mounting, including a tapered edge to facilitate welding to a post, a grout sleeve to accommodate a grout connection, or other features that may be used to make a structural connection to a post. An upper end 78 of the footing 32 includes an arcuate-shaped flange 80 that is adapted to mate to the flange 28 at the lower end 30 (FIG. 2) of a formed panel 26. A body 82 of the footing 32 has a smooth transition between the circular lower end 76 and the arcuate-shaped upper end 78 to provide for a smooth flow of forces that minimizes the magnitude of any stress risers that might be present.

The upper, arcuate flange 80 of the footing 32 may be oriented to have a joint face 84 that lies substantially orthogonal to the longitudinal axis 86 of the post to which the footing 32 is mounted, as shown in FIGS. 9 and 10. In this respect, the bulk of the forces applied to the post from the transition structure 20, which are predominantly compressive forces, may be received substantially directly in compression across the joint face 84 of the arcuate flange 80, rather than in shear or otherwise. Additionally, the mounting defined by the lower end 76 of the footing 32 may be general planar and may likewise lie substantially orthogonal to the longitudinal axis of the associated leg/post.

The arcuate flange(s) 80 of the footing 32 and the mating flange 28 at the lower end 30 of the formed panels 26 may have a variety of configurations. As illustrated, the flanges 28, 80 extend about an arc of about 90 degrees each, such that together a full circle is formed by the flanges, at least for embodiments used with foundations having four posts. According to other embodiments, longer or shorter arcs of curvature may be used. Other configurations are also possible and are contemplated, including arcs of varying curvature and arcs that include some linear sections, as aspects of the invention are not limited in this respect.

Due to having a relatively smaller size, as compared to the overall transition structure 20, the footings 32 may be transported with relative ease and may be manufactured through a wide variety of techniques, including casting. More complex shapes may be included in the footings 32 without increasing the complexity of a production process that may be used to manufacture the panels 26. Examples of the more complex shapes include the arcuate flange 80, circular lower end 76, the transition therebetween (footing body 82), and potentially a mounting structure for the platform 16 (FIG. 1). This may allow the tower transition structure 20 to be formed through less expensive processes using less material, as may be the case with the formed panels 26 described herein.

Figure 11:
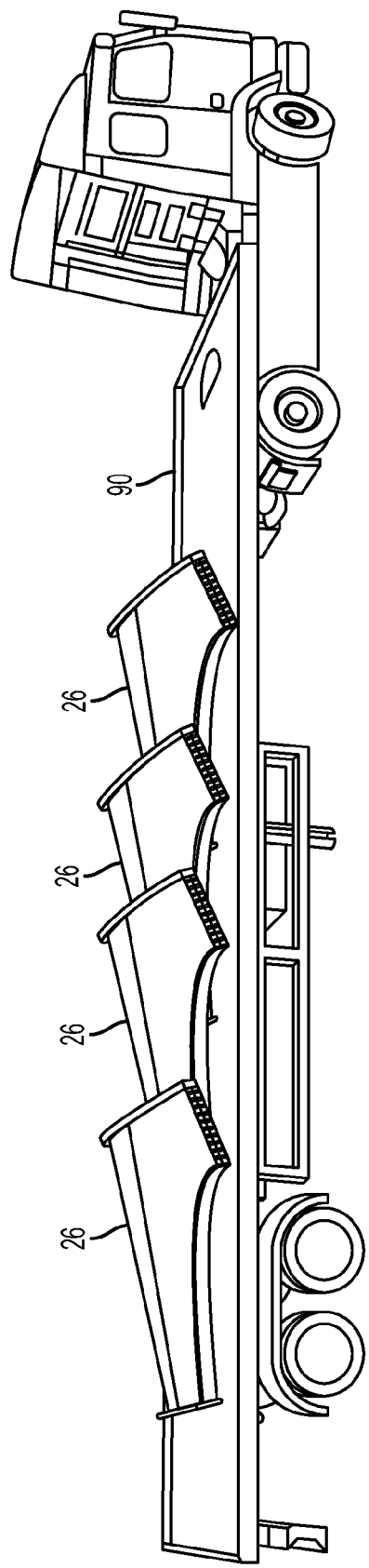
FIG. 11 shows multiple formed panels stacked together for shipment on a trailer, according to one embodiment.
Figure 12:
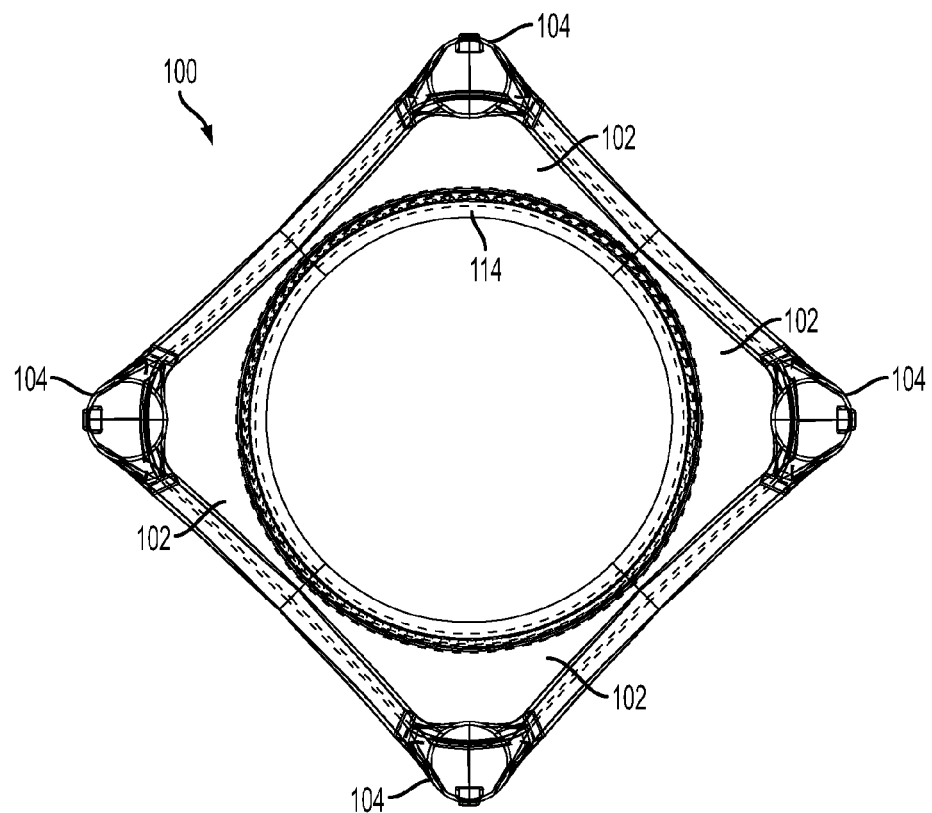
FIG. 12 is a top plan view of a transition structure according to another embodiment.
Figure 13:
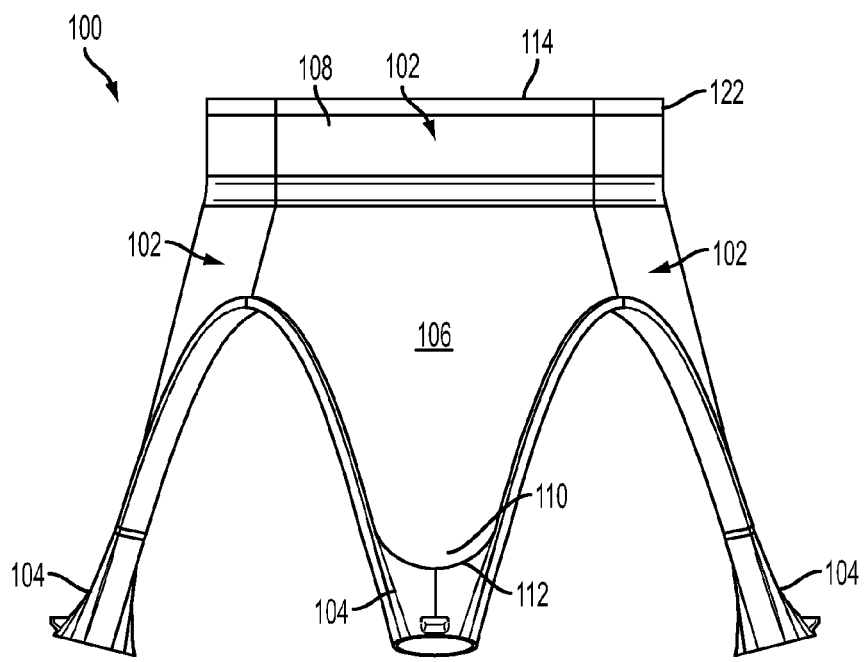
FIG. 13 is a front elevation view of the transition structure shown in FIG. 12.

Constructing the panels 26 of separately from the footings 32 may provide several benefits. As may be appreciated, transition structures 20 of larger sizes, such as those used to support towers that have lower end diameters of 4 meters or greater, 6 meters or greater, or even 8 meters or greater, may prove particularly difficult to transport over sea and especially on roads over land. Embodiments of the formed panels 26 described herein, however, may be manufactured at a factory and transported to an erection site for final assembly, thereby minimizing the overall dimensions of the transition structure 20 for transportation. FIG. 11 shows how formed panels 26 may be stacked for shipment over road on a trailer 90.

In the embodiments shown in FIGS. 2, 4, and 7, the panels 26 are shown being formed entirely of sheet metal that, aside for bends between some of the sub-panels, remains in a substantially flat configuration. Flanges 24 and 28 exhibit curved forms, but these forms lie within flat planes and thus may be cut from a flat sheet of material. In this respect, it is possible to form the panels 26 as a collection of flat surfaces, providing the transition structure 20 with a faceted appearance. Such techniques may minimize or eliminate the need for more complex bending processes during manufacturing.

According to some embodiments, formed panels 26 may include smoothly curved surfaces rather than a faceted construction. In such embodiments, an entire formed panel may be constructed to have a continuous smoothly curved surface, or individual sub-panels may have a smoothly curved surface and be joined to adjacent sub-panels that are either curved as well or that have substantially flat surfaces.

One embodiment illustrating some of these variations is shown in FIGS. 12-15. In these figures, a transition structure 100 includes a plurality of panels 102 and plurality of footings 104. The panels 102 are secured together to define a main body of the transition structure 100. Each panel 102 includes a panel body 106 having upper and lower ends 108, 110, a lower mounting surface 112 at the lower end 110, and an upper mounting surface 114 at the upper end 108. The upper mounting surface 114 is generally planar (i.e., flat) and, in the embodiment shown, is defined by an inwardly-extending flange 122 welded to the panel body 106. At least a portion of the panel body 106 tapers between the upper and lower ends 108, 110. There are also lateral mounting surfaces 116 at lateral edges of the panel body 106. The panels 102 are configured to mount to each other at the lateral mounting surfaces 116 to form, with the upper ends 108 of the panel body 106, a shape that conforms to a lower end of a tower to be supported.

Figure 14:
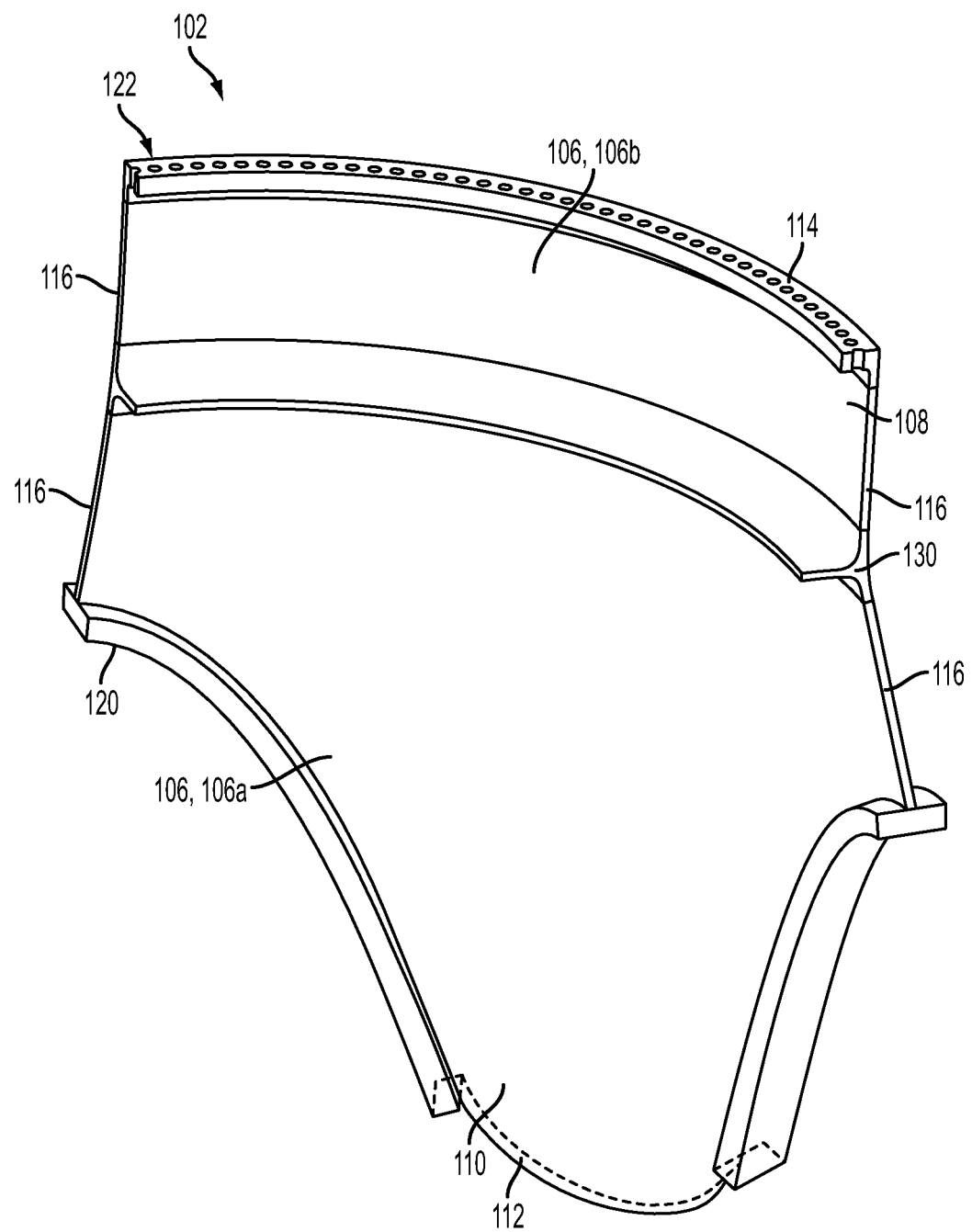
FIG. 14 is a perspective view of a panel and footing used in the embodiment of FIG. 12.

FIG. 14 illustrates one of the panels 102 in further detail. The panel body 106 includes first and second sub-panels 106a, 106b, which may each be formed from steel that has been rolled into the desired shape. Their simple structure facilitates the manufacturing process, making it easier to produce the sub-panels at locations closer to the intended site of the wind turbine. As with the other embodiment discussed above, however, other manufacturing techniques may be used if desired.

The first sub-panel 106a defines the lower end 110 and most of the overall structure of the panel body 106, including the taper between the upper and lower ends 108, 110. The first sub-panel 106a is also shaped to provide the generally conical arrangement of the transition structure 100 when the panels 102 are assembled together. Flanges 120 may be provided along edges of the first sub-panel 106a that define the spaces 34 between adjacent panels in the transition structure 20. The flanges 120 provide additional strength to the panel 102, similar to the flanges 58 in the embodiment of FIGS. 2, 4, and 7.

The second sub-panel 106b defines the upper end 108 of the panel body 106 and is generally prismatic. A flange 122 may be provided on the second sub-panel 106b (e.g., by welding) to define the upper mounting surface 114, much like the flange 24 in the embodiment of FIGS. 2, 4, and 7. The flange 122 is shown as having an arcuate profile, but as stated in connection with the embodiment of FIGS. 2, 4, and 7, it is to be appreciated that the upper end 108 and upper mounting surface 114 may have shapes different than what is shown. The shapes generally conform to the lower end of the tower to be supported, which could have a polygonal, oval, or other cross-sectional shape, for example.

A flange 130 that extends inward is arranged between the first and second sub-panels 106a, 106b, which may be welded to the flange 130. In other embodiments, the first and second sub-panels 106a, 106b may be secured directly together (e.g., by welding) such that the flange 130 is not present. After assembling or forming the panel 102, it can be joined to other panels by welding the lateral mounting surfaces 116 to those of adjacent panels. In alternative embodiments, flanges and bolted connections may be used to connect the lateral mounting surfaces 116 together.

Figure 15:
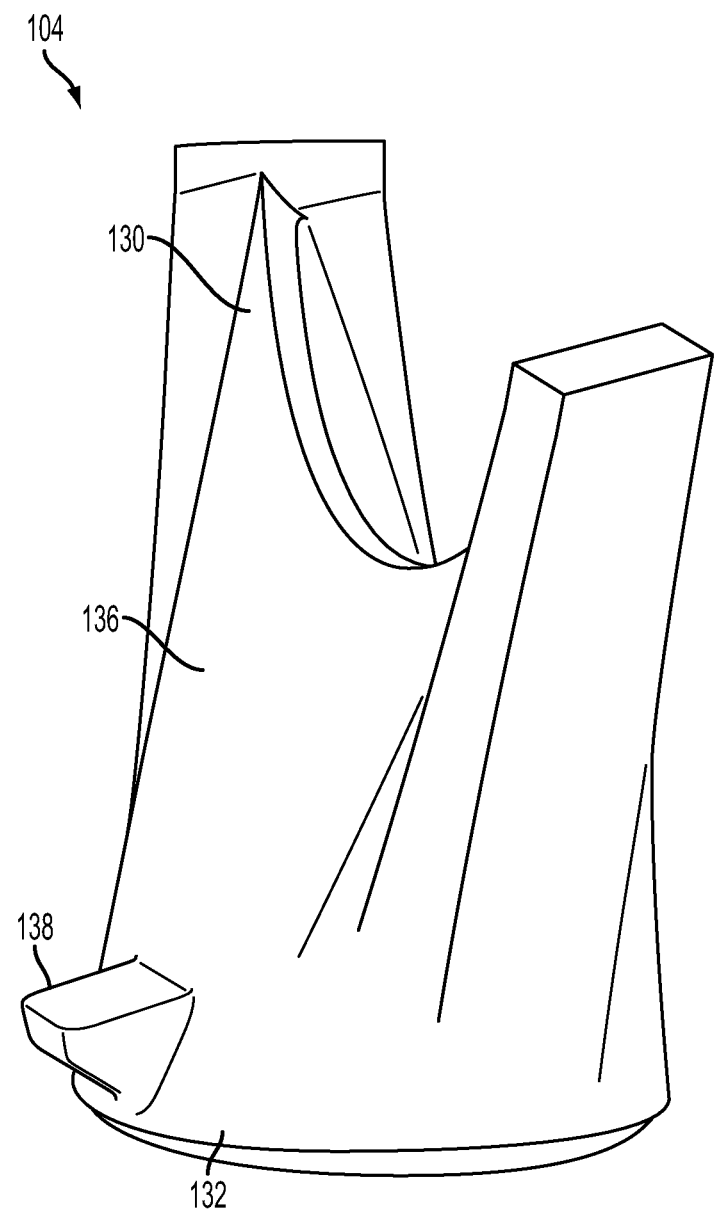
FIG. 15 is a perspective view of the footing shown in FIG. 14.

Now referring to FIG. 15, one of the footings 104 is illustrated in further detail. The footing 104 is similar to the footings 32 discussed above in that it can be provided with more complex geometries without substantially increasing the overall complexity associated with manufacturing the transition structure 100 as a whole. This may be achieved by casting the footing 104 from a metal material, for example. The footing 104 includes an upper end 130 configured to mate to the lower mounting surface 112 of one of the panels 102. The lower mounting surface 112 is not generally planar in the embodiment shown in FIGS. 12-14, which is why the upper end 130 of the footing 104 in FIG. 15 is generally U-shape. This U-shape conforms to the shape of the lower mounting surface 112 so that the footing 104 can be welded to the panel 102. In alternative embodiments, however, a connection similar to that in FIG. 2 may be provided.

The footing 104 also includes a lower end 132 that defines a mounting for connecting to the posts 8 (FIG. 1) of a foundation. The lower end 132 may have a different shape than the upper end 130, with a footing body 136 providing a smooth transition between them. A mounting structure 138 projecting from the footing body 136 may also be provided for supporting the platform 16 (FIG. 1). The mounting structure 16 may be secured to the footing body 136 (e.g., by welding) or integrally formed with the footing body 136 (e.g., during the casting process).

Although various embodiments are shown and described herein that use footings to provide a smooth transition to a foundation, it is to be appreciated that some embodiments may include footings configured to mount to different types of foundations or that lack footings altogether. By way of example, some on-shore embodiments of foundations may include structures that make a direct connection with arcuate flanges at lower ends of formed panels, such that no separate footing is needed.

A tower mating surface in the illustrated embodiments is formed from smaller flanges that are first joined the upper ends of each of the formed panels, prior to the formed panels being joined together. Alternatively, a flange that mates to the tower may be joined to the formed panels after the formed panels have been jointed to one another. According to one embodiment not shown herein, the flange that provides a mating surface to the tower is provided as a continuous ring that is welded to the formed panels after the formed panels have been welded to one another. Other arrangements are also possible and are contemplated.

It should be understood that aspects of the invention are described herein with reference to the figures, which show illustrative embodiments in accordance with aspects of the invention. The illustrative embodiments described herein are not necessarily intended to show all aspects of the invention, but rather are used to describe a few possibilities. By way of example, while the figures show the transition structure used in an offshore application to provide support to a tower of wind turbine on a foundation, other uses are also possible, such as on-shore applications and/or applications where the transition structure is used to mate upper and lower portions of a hybrid tower for a wind turbine. Thus, aspects of the invention are not intended to be construed narrowly in view of the illustrative embodiments. In addition, it should be understood that aspects of the invention may be used alone or in any suitable combination with other aspects of the invention; skilled persons will understand how features of the various embodiments may be combined in different ways.

The invention claimed is:

1. A transition structure supporting a tower on posts, comprising:
   a plurality of panels that each includes:
      a panel body having opposed upper and lower ends;
      a lower mounting surface at the lower end of the panel body;
      an upper mounting surface at the upper end of the panel body, the upper mounting surface being generally planar, the panel body tapering from the upper mounting surface to the lower mounting surface; and
      a pair of lateral mounting surfaces at lateral edges of the panel body,
   wherein each of the plurality of panels is mounted to at least another of the plurality of panels at corresponding lateral mounting surfaces to form, with the upper ends of the plurality of panels, a shape that conforms to a lower end of the tower to be supported; and
   a plurality of footings each including an upper end mated to the lower mounting surface of one of the panels, a lower end configured to mate with one of the posts, and a footing body between the upper and lower ends.

2. The transition structure of claim 1, wherein the lower end of each footing defines a substantially circular mounting.

3. The transition structure of claim 1, wherein the upper mounting surface of each panel body has an arcuate profile.

4. The transition structure of claim 3, wherein the lower mounting surface of each panel is generally planar and has an arcuate profile, and further wherein the arcuate profile of the upper mounting surface of each panel has a radius of curvature that is greater than a radius of curvature of the arcuate profile of the lower mounting surface of the panel.

5. The transition structure of claim 1, wherein one or more of the panels comprise a plurality of substantially flat sub-panels connected to one another by bends or welds.

6. The transition structure of claim 5, wherein each of the panels comprises substantially flat sub-panels.

7. The transition structure of claim 1, wherein each footing is mated to one of the panels by welding the upper end of the footing to the lower mounting surface of the panel.

8. The transition structure of claim 1, wherein each panel comprises rolled or bent steel and each footing comprises cast metal.

9. The transition structure of claim 1, wherein each of the panels includes one or more stiffening ribs mounted to the panel body.

10. The transition structure of claim 1, wherein the upper mounting surface of each panel comprises a flange.

11. The transition structure of claim 1, wherein the lateral mounting surfaces of each panel comprises a flange for bolting the panel to the lateral mounting surface of another panel.

12. The transition structure of claim 1, wherein the plurality of panels define one or more spaces between the lateral edges of adjacent panels that allow passage to a space interior to the transition structure.

13. A wind turbine, comprising:
   a tower;
   a foundation supporting the tower, the foundation having multiple posts; and
   a transition structure positioned between the tower and foundation for supporting the tower on the posts, the transition structure comprising:
      a plurality of panels that each includes:
         a panel body having opposed upper and lower ends;
         a lower mounting surface at the lower end of the panel body;
         an upper mounting surface at the upper end of the panel body, the upper mounting surface being generally planar, the panel body tapering from the upper mounting surface to the lower mounting surface; and
         a pair of lateral mounting surfaces at lateral edges of the panel body,
      wherein each of the plurality of panels is mounted to at least another of the plurality of panels at corresponding lateral mounting surfaces to form, with the upper ends of the plurality of panels, a shape that conforms to a lower end of the tower to be supported; and
      a plurality of footings each including an upper end mated to the lower mounting surface of one of the panels, a lower end mated to one of the posts, and a footing body between the upper and lower ends.

14. The wind turbine according to claim 13, wherein the posts of the foundation have a batter angle, and further wherein the panels and footings of the transition structure are arranged to provide the transition structure with a batter angle generally corresponding to the batter angle of the posts.

15. The wind turbine according to claim 13, wherein each post extends along a longitudinal axis through the center of the post, wherein the lower end each footing defines a mounting that is generally planar and that lies orthogonal to the longitudinal axis of the associated post.

16. A wind turbine transition structure supporting a wind turbine tower on foundation posts, comprising:
- a plurality of metal panels that each includes:
  - a panel body having opposed upper and lower ends;
  - a lower mounting surface at the lower end of the panel body;
  - an upper mounting surface at the upper end of the panel body, the upper mounting surface being generally planar, the panel body tapering from the upper mounting surface to the lower mounting surface; and
  - a pair of lateral mounting surfaces at lateral edges of the panel body,
- wherein each of the plurality of panels is mounted to at least another of the plurality of panels at corresponding lateral mounting surfaces to form, with the upper ends of the plurality of panels, a shape that conforms to a lower end of the tower to be supported; and
- a plurality of footings each including an upper end welded to the lower mounting surface of one of the panels, a lower end configured to mate with one of the posts, and a footing body between the upper and lower ends.

\* \* \* \* \*

UNITED STATES PATENT AND TRADEMARK OFFICE
CERTIFICATE OF CORRECTION

| | | |
|---|---|---|
| PATENT NO. | : 9,249,784 B2 | Page 1 of 1 |
| APPLICATION NO. | : 14/342249 | |
| DATED | : February 2, 2016 | |
| INVENTOR(S) | : Gerner Larsen et al. | |

It is certified that error appears in the above-identified patent and that said Letters Patent is hereby corrected as shown below:

Title Page:

(57) Abstract, second line, change "includes" to --include--

In the Specification:

At column 1, line number 53, change "footing" to --footings-- and at line 58 after "that" delete "is"

At column 2, line number 5, after "end" insert --of-- and at line 26, after "included" insert --in--

At column 7, line number 29, after "26" delete "of"

At column 9, line number 21, after "joined" insert --to-- and at line number 25, change "jointed" to --joined--

In the Claims:

At column 9, claim number 1, line number 53, change "includes" to --include--

At column 10, claim number 5, line number 16, change "comprise" to --comprises--

At column 10, claim number 11, line number 32, change "comprises" to --comprise--

At column 10, claim number 13, line number 45, change "includes" to --include--

At column 11, claim number 15, line number 5, after "end" insert --of--

At column 11, claim number 16, line number 10, change "includes" to --include--

Signed and Sealed this
Tenth Day of May, 2016

Michelle K. Lee
*Director of the United States Patent and Trademark Office*